Aug. 4, 1931.  S. M. FAIRCHILD  1,817,182
DRIVING AND CONTROLLING MECHANISM FOR AUTOMATIC CAMERAS
Filed Oct. 17, 1922   3 Sheets-Sheet 2
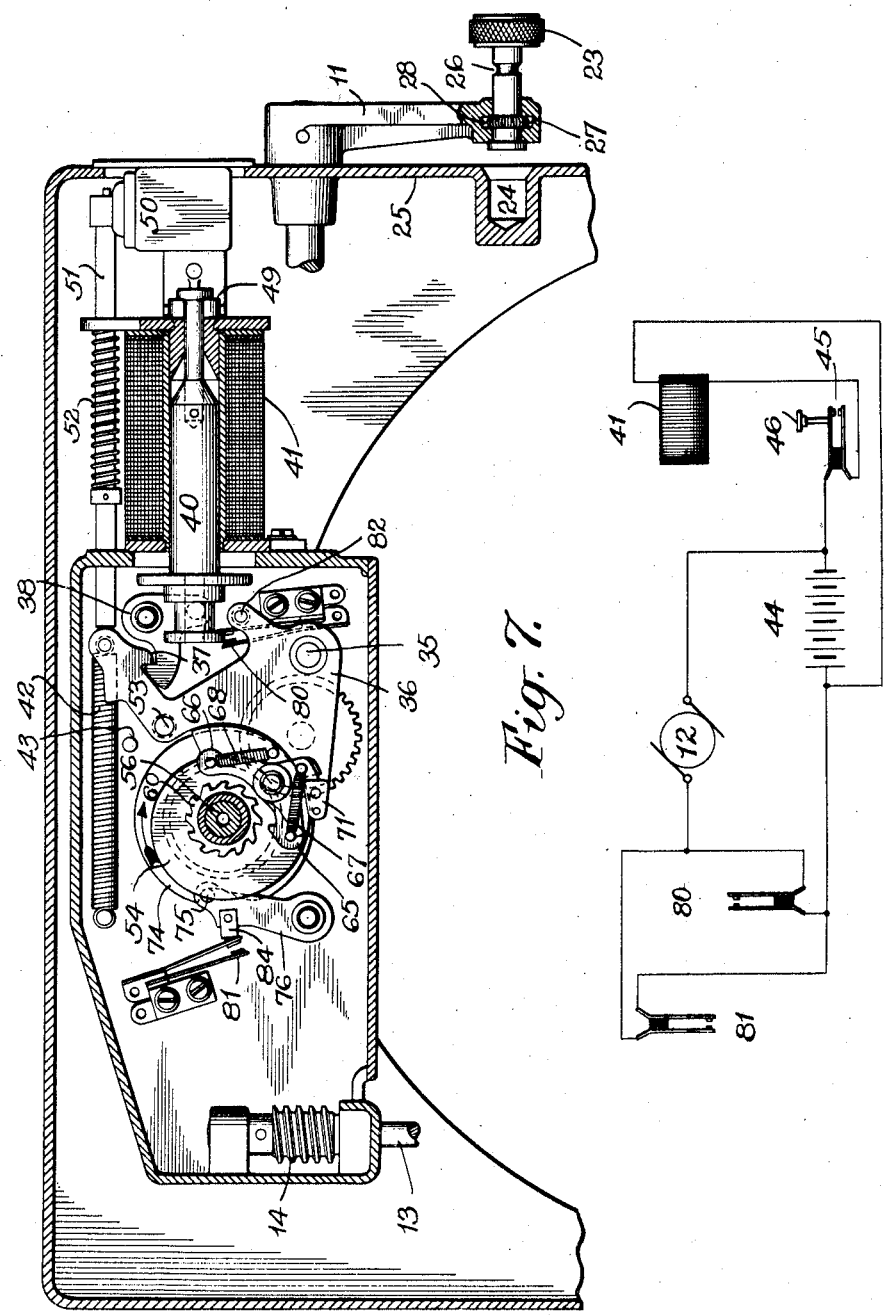

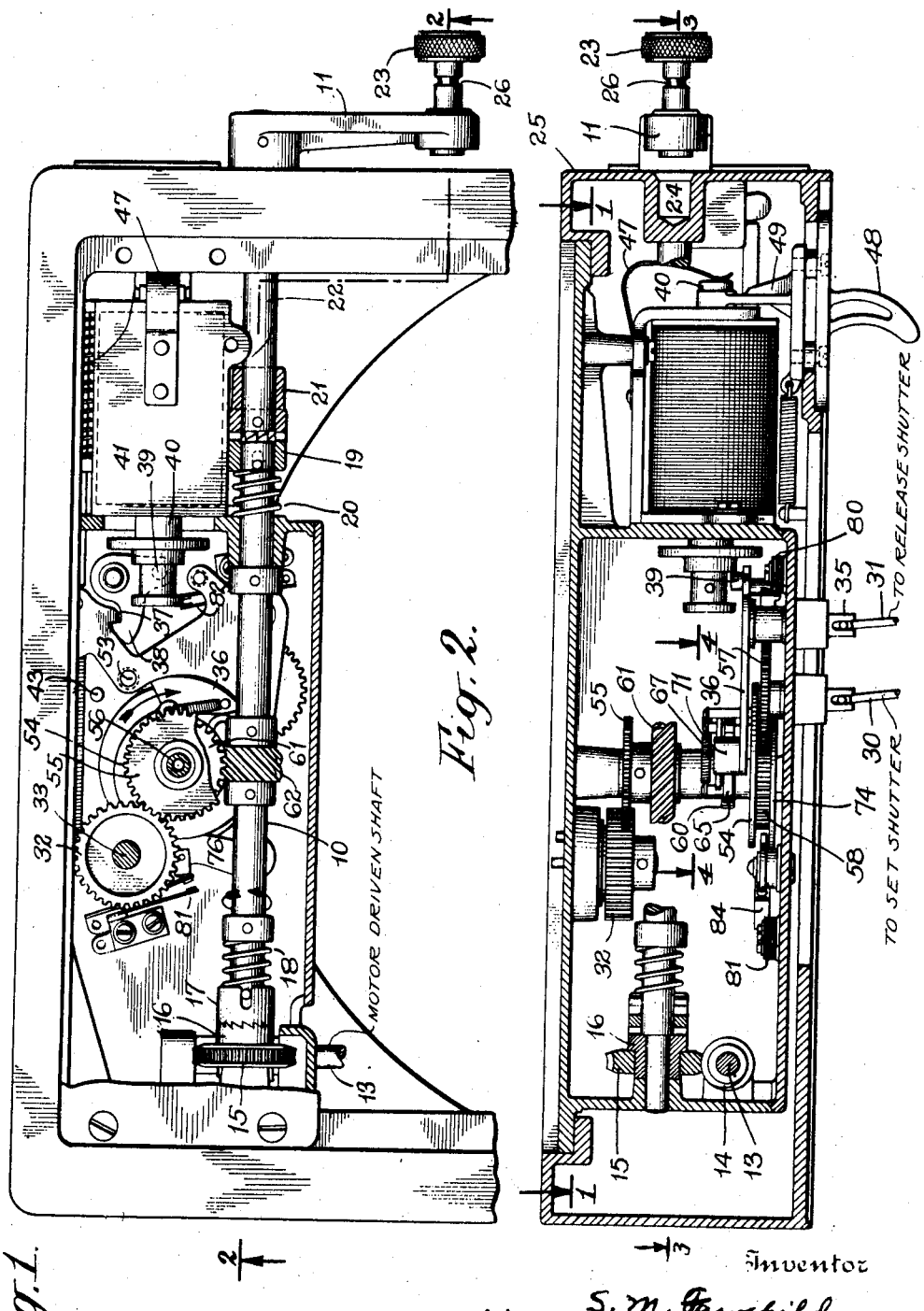

Patented Aug. 4, 1931

1,817,182

UNITED STATES PATENT OFFICE

SHERMAN M. FAIRCHILD, OF NEW YORK, N. Y.

DRIVING AND CONTROLLING MECHANISM FOR AUTOMATIC CAMERAS

Application filed October 17, 1922. Serial No. 595,047.

This invention relates to automatic cameras, that is, cameras in which the operation of changing the plate or film or the operation of setting the shutter, or both operations, may be effected by suitable mechanism or mechanisms actuated by driving mechanism which is itself driven by the hand of the operator or by means of a motor, as for example a spring-motor, wind-motor, or electric motor. More particularly the invention relates to the driving mechanism, and one of its objects is to provide simple and effective means which will permit such mechanism to be actuated by hand or by the motor, at will, without other preliminary manipulation than grasping or releasing the handle or hand-crank. Another object is to provide driving mechanism which, operating with unfailing certainty, will effect the operations of changing of the plate or film and the setting of the shutter, and will automatically lock or disable the shutter-release mechanism so that the shutter cannot be discharged until the two operations mentioned have been fully completed. A further object is to provide positively acting means by which the shutter can be released manually, as by means of a suitable trigger or key, or electrically, as by closing a circuit at any suitable point near or remote. To these and other ends the invention comprises the novel features and combinations hereinafter described.

One form of the invention is illustrated in the accompanying drawings, in which

Fig. 1 is a plan view partly in section on line 1—1 of Fig. 2.

Fig. 2 is a section taken, roughly, on line 2—2 of Fig. 1.

Fig. 3 is a detail section taken about on line 3—3 of Fig. 2.

Fig. 4 is a detail section on line 4—4 of Fig. 2, showing the position of the parts immediately after the release of the shutter.

Fig. 5 is a detail section on line 5—5 of Fig. 4 and Fig. 6 is a detail section on line 6—6 of Fig. 5.

Fig. 7 is a diagram illustrating the electric circuits employed.

Referring first to Figs. 1 and 2, 10 designates a driving shaft which may be rotated by means of a hand-crank 11; or by means of an electric motor 12, Fig. 7, connected in any convenient manner, as by suitable gearing not shown, to a transmission shaft 13. The latter shaft has a worm 14 meshing with a worm gear 15 pinned or otherwise fixed on the hub of a clutch-member 16 which is rotatable but is axially stationary on the adjacent end of the driving shaft 10. The latter also has a sliding clutch member 17, having ratchet teeth to cooperate with the teeth on the first mentioned clutch member and urged into engagement therewith by a spring 18, to permit the shaft 10 to be driven in the direction of the arrow. At the other end of the shaft 10 is a similar sliding clutch member 19 urged by a spring 20 into engagement with a clutch member 21 pinned on the adjacent end of the aligned crank shaft 22. It will be observed that the ratchet teeth on the two clutches, 16—17, 19—21, are opposite in direction. Accordingly, if the motor is driving the shaft 10 the camming effect of the cooperating teeth of clutch 19—21 can slide member 19 back on the shaft against the pressure of spring 19. In other words, clutch 19—21 simply overruns. Similarly, if the motor is disabled and the shaft is being rotated by means of the hand crank, or if the shaft is being driven by the hand crank faster than the motor can rotate the clutch member 16, the clutch 16—17 likewise overruns. To keep the crank from swinging or revolving when not in use the stem of the handle 23 is shifted into a locking recess 24 in the side of the casing 25. This handle is provided with two circumferential grooves, one of which is shown is shown at 26, Fig. 3. In the other is seated a helical spring 27 held around the stem by an annular groove 28 in the end of the crank. When the stem is pressed into the recess 24 the spring is cammed into the groove 28 and snaps into the outer groove 26 when the stem is seated in the locking recess, thereby holding the handle yieldingly in the recess. To release the crank for use it is only necessary to pull the handle out until the spring snaps into the other groove in the stem.

The shutter, not shown, is "set" by a rotatable shaft 30, Fig. 2, which for the purposes of the present case may be taken to represent the shutter-setting mechanism. The shutter is released, to make an exposure, by a rock-shaft 31, Fig. 2, which, similarly, may be taken to represent the shutter-release mechanism. If the shutter is of the self-setting type, either shaft may perform both functions. The changing mechanism not shown, by which the plate or film is changed in each cycle of operation, is actuated by the gear 32 and shaft 33 (Fig. 1) on which it is fixed. In like manner, this shaft and gear can be taken to represent the changing mechanism. It will be understood that the casing 25 represents what may be termed the body of the camera, which carries on its under side a "lens cone" containing the lens and on its upper side a "magazine" containing the changing mechanism and the plates or films, the latter preferably in the form of strip wound on a supply spool from which it is drawn by a receiving or take-up spool.

For the purpose of rocking the shaft 31 to release or trip the shutter, the shaft is connected to a pivoted stud 35, Figs. 2 and 3, which carries on its inner end a latch plate 36 having a tooth 37 normally engaged by a pivoted dog 38 which holds the plate in its home or inoperative position, shown in Fig. 3. The dog mentioned has a stud 39, Fig. 4, extending into a groove in the adjacent end of the core 40 of a solenoid 41, so that when the solenoid is energized and the core retracted the dog will be disengaged from the latch plate and thus permit the latter to be rocked counterclockwise by the spring 42, as in Fig. 4, until arrested by the stop 43. The movement thus imparted to the shaft 31, Fig. 2, releases the shutter.

The solenoid 41 is in circuit with a battery or other source of current 44, Fig. 7, which circuit also contains a pair of normally open spring contacts 45 located at any convenient point and adapted to be closed by means of a key 46. When the contacts are opened again by release of the key the circuit is of course broken, whereupon the leaf spring 47, Figs. 1 and 2, advances the solenoid core to its initial position, shown in Figs. 1 and 3. The core may also be retracted manually by means of a sliding trigger 48, Fig. 2, connected to the rear end of the core by an arm 49.

Each release of the latch plate 36 (by which the shutter is tripped) is registered on a suitable counter 50, Fig. 3. For this purpose the counter is actuated by a sliding rod 51, urged leftwardly and normally held against the outer end of the latch plate by a spring 52, so that when the plate is swung by its spring 42 the rod will follow. On the return movement of the plate (effected as explained below) the rod is retracted and the spring 52 again compressed.

When the forked latch plate or yoke 36 swings counterclockwise (Fig. 4) to release the shutter the stud or stop 53 on the plate is carried into engagement with the spiral or snail cam 54, which, as hereafter explained, rotates in the direction of the arrow, thereby swinging the plate gradually back to its initial position and into engagement again with the dog 38. This means that the dog is cammed in the counterclockwise direction as the tooth 37, Fig. 3, passes over it, but such movement of the dog is permitted by the spring 47, Fig. 2, which serves to advance the solenoid core and hold the dog yieldingly in the path of the latch plate tooth 37. It will be observed that after the cam has swung the latch plate the latter is held positively in such position until the drop in the cam has passed the stud 53, as in Fig. 3. By that time, however, the changing mechanism and the shutter-setting mechanism have completed their operations. In other words, the operator may close the contacts 46, or pull the trigger 48, at any time he pleases, but the shutter cannot thereby be discharged until it has been set and the plate or film changed. Nor can the shutter spring be over-wound more than to the slight extent mentioned hereinafter. On the other hand, if he holds the latching dog in non-engaging position, by keeping the solenoid circuit closed or the trigger 48 retracted, the latch plate will trip the shutter every time the drop in the cam reaches the stud 53, thus causing an exposure to be made at each rotation of the cam. But even in that case the exposure can occur only after, and never before, the plate or film has been changed.

The gear 32, which, with its shaft 33 represents the changing mechanism as stated above, is driven by a gear 55, Figs. 1 and 2, fixed on a transverse counter shaft 56, and the shaft 30, which, as before stated, represents the shutter-setting mechanism, is driven by a gear 57 meshing with a gear 58 fixed on the same shaft 56 to which cam 54 is also fixed. The shaft 56 is itself driven by the devices described below.

On the shaft 56, just mentioned, is a loose sleeve 59, Figs. 4 and 5, on which are fixed a driving ratchet 60, and a helical driving gear 61, the latter meshing with a similar gear 62, Fig. 1, on the driving shaft 10. It will therefore be seen that to rotate the shaft 56 and gears 55 and 58, thereby actuating the changing and setting mechanisms, the sleeve and shaft must be connected. For this purpose the following instrumentalities are provided.

On the cam 54, which is fixed on the shaft 56, is a pivoted driving pawl 65, Figs. 3, 4 and 6, and on the same pivot is a controlling dog 66. Springs 67 and 68 are provided to hold the pawl and dog normally in the relative positions shown in Fig. 3, in which the stud 69 on the pawl bears against an arm 70 of the dog. In this position the tail of the dog rests against a lug 71 on the extension 72 of the latch plate 36, which holds the pawl out of engagement with the driving ratchet 60. When, however, the latch plate is rocked counterclockwise to discharge the shutter as previously explained, the lug 71 is disengaged from the dog, whereupon the spring 68 rocks the dog and pawl assembly clockwise and brings the latter into engagement with the ratchet 60, as in Fig 4. If, then, the latter is rotating or begins to rotate, in the direction of the arrow, Fig. 4, the shaft 56 and gears 57 and 58 are rotated therewith. Revolving in the direction of the arrow, Fig. 4, the pawl 65 and dog 66 approach their initial position just after the latch plate has been re-engaged by the locking pawl 38 as previously explained, so that the lug 71 is in the path of the tails of the pawl and dog. The tail of the dog therefore strikes the lug and is rocked counterclockwise thereby tensioning spring 67, until the tail of the pawl is also in contact with lug 71. The movement of the dog and pawl assembly being continued, the pawl is rocked out of engagement with the ratchet, and spring 67 rocks the pawl farther from the ratchet so that it cannot re-engage the latter upon the reverse movement of the cam 54 explained hereinafter. At this instant the drop on cam 54 is beyond the stud 53 on the latch plate, the recess 73 in the disk 74, Fig. 6, is beyond the stud 75 on arm 76, and the shutter driving spring (not shown) has been slightly over-wound. The latter spring therefore reverses the movement of the cam 54 and shaft 56 and turns them backward until the shoulder 73 in disk 74 comes against the stud 75 as in Fig. 3, thereby arresting the backwardly turning parts in the position shown in the figure just mentioned. In this position, as in Fig. 4 also, the tail of the pawl 65 is in rear of the tail of the dog 66 and hence is not bearing against lug 71. On the other hand, the stud 69 is held in engagement with arm 70 by spring 67, so that when the lug is again swung down, the dog, urged by spring 68, will positively carry the pawl into engagement with the ratchet. It will be seen that spring 68, under tension when the parts are in initial position, Fig. 3, and the slightly over-wound shutter-spring, tend to rotate the cam 54 counterclockwise. This movement, however, is prevented by stud 75 in the recess 73 in disk 74, which is rigidly connected with the cam.

Inasmuch as the changing and shutter-setting mechanisms are entirely disconnected from the shafts 56 and 10 when said mechanisms have performed the functions for which they are designed, the motor which drives the two shafts may run continuously. It is preferred to stop the motor after the camera has been prepared for the exposure and start it again after the shutter has been released. For this purpose the motor circuit, Fig. 7, is provided with two pairs of normally open spring contacts 80, 81, in parallel with each other. The first pair is closed by an insulating stud 82, Fig. 3, on the latch plate 36, when the latter is swung counterclockwise after release by the dog 38. This closes the motor circuit and the motor therefore starts. As the cam disk 74 starts, the incline therein (see Figs. 4 and 6) cams the arm 76 counterclockwise, causing the insulating finger 84 to close the contacts 81, thus laying a shunt across contacts 80, Fig. 7. When the latch plate is swung back to initial position by the cam 54 the last mentioned contacts open again; but the motor circuit is not broken thereby, since the cam 74 is still holding the contacts 81 closed, and continues to do so until the recess in its edge reaches the stud 75. This occurs just after the changing and setting mechanisms have been fully operated. The motor then stops, both pairs of contacts being open, and does not start again until the shutter has been released for the next exposure.

The operation of the devices illustrated is described in detail in the foregoing, but may be briefly summarized as follows:

Retraction of the solenoid core 40 (by closing the solenoid contacts 45, Fig. 7, or by pulling the trigger 48, Fig. 2) rocks the dog 38, Fig. 3, counterclockwise, thereby releasing the latch plate 36, which is at once swung in the same direction by its spring 42. This movement of the latch plate withdraws lug 71 from the tail of dog 66, allowing the driving pawl 65 to swing up into engagement with the driving ratchet 60, and causes stud 82 to close the motor contacts 80, thereby starting the motor 12 and connecting the shaft 56 and gears 57, 58, with the motor-driven gear 61, ratchet 60, and cams 54, 74. The mechanisms for changing the plate or film and setting the shutter are thus actuated. As the cam 54 revolves it gradually restores the latch plate 36 to initial position; and shortly after cam 74 starts, it rocks arm 76 and thereby closes the contacts 81 so that when the contacts 80 are opened by the homeward movement of the latch plate the motor circuit will still be closed. As the revolving cam 54 approaches its initial position the tails of pawl 65 and dog 66 meet the lug 71 and are swung counter-clockwise, disengaging the pawl from the ratchet. At the same time the contacts 81 open, swinging arm 76 into the recess in cam disk 74. The shutter-spring, which has been slightly over-wound by the clockwise rotation of the gear 58, now reverses the movement of the gear and the associated cams 54, 74, thereby bringing the aforesaid shoulder 73 against the stud 75. All the parts are now in their initial positions, as in Fig. 3, with the plate or film changed, the shutter set, and the motor circuit open. If instead of releasing the key 46 or trigger 48 after the motor is tripped the operator keeps the key depressed or the trigger retracted, thereby preventing engagement of the latch plate tooth 37 by the dog 38, the latch plate will, as soon as the drop on cam 54 passes the stud 53, which occurs shortly after the plate or film has been changed and the shutter reset, swing forward again under the influence of spring 42 and thus release the shutter, thereby making another exposure and again starting the driving mechanism. This operation will of course be repeated as long as the dog 38 is held in inoperative position.

It is to be understood that the invention is not limited to the specific construction herein illustrated and described but can be embodied in other forms without departure from its spirit.

I claim:

1. In a camera mechanism, in combination, a driving element, a driven element, automatically engageable normally disengaged connecting devices associated with said elements to drive one from the other, shutter-tripping means, a latching device shiftable in one direction to disengage said connecting devices and in another direction to actuate the tripping mechanism and to permit engagement of the connecting devices, and means actuated by one of said elements to prevent shifting of the latching device in the last mentioned direction until a predetermined time in the cycle, a solenoid, a retaining element, operated by the sliding core thereof, for locking said latching device against movement when said shutter is set, electrical means for energizing said solenoid and a mechanical trigger means independent of said electrical means for retracting said core and releasing said latching device to effect the tripping of said shutter.

2. In a camera driving mechanism, in combination, a driving element, a driven element, changing mechanism connected with the driven element for actuation thereby, automatically engageable normally disengaged connecting devices associated with said elements to drive one from the other, a shiftable latching device to disengage said connecting devices and releasable therefrom to permit engagement thereof, shutter-tripping means actuated by the latching device, and means actuated by one of said elements to prevent shifting of the latching device and consequent operation of the tripping means until the changing mechanism has operated, a solenoid, a retaining element, operated by the sliding core thereof, for locking said latching device against movement when said shutter is set, electrical means for energizing said solenoid and a mechanical trigger means independent of said electrical means for retracting said core and releasing said latching device to effect the tripping of said shutter.

3. In a camera driving mechanism, in combination, a rotary driving element, a rotary driven element, one of said elements being a cam, a ratchet carried by one of said elements and a pawl carried by the other, changing mechanism actuated by the driven element, a shiftable latching device adapted to cooperate with the pawl to swing and hold the same out of engagement with the ratchet, shutter-tripping means connected with the latching device, means for shifting the latching device to actuate the tripping mechanism and to release the pawl and permit engagement thereof with the ratchet, and means actuated by said cam to shift the latching device back into cooperation with the pawl and prevent reactuation of the tripping mechanism until the changing mechanism has operated, a solenoid, a retaining element, operated by the sliding core thereof, for locking said latching device against movement when said shutter is set, electrical means for energizing said solenoid and a mechanical trigger means independent of said electrical means for retracting said core and releasing said latching device to effect the stripping of said shutter.

4. In a camera driving mechanism, in combination, a ratchet, a cam coaxial therewith, a pawl carried by the cam to engage the ratchet whereby one may be driven by the other, a latch plate shiftable in one direction by the cam, a stop carrier by the latch plate to co-operate with the pawl and disengage the same from the ratchet when the plate is shifted by the cam, means for shifting the plate in another direction to release the pawl and permit the same to engage the ratchet, and shutter-release mechanism actuated by the last-mentioned shifting of the latch plate.

5. In a camera driving mechanism, in combination, a ratchet, a cam co-axial therewith, a pawl carried by the cam to engage the ratchet whereby one may be driven by the other, changing mechanism actuated by the driving element, shutter-release mechanism, a latch plate connected with the shutter-release mechanism and shiftable in one direction by the cam, a stop carried by the latch plate to co-operate with the pawl and disengage the same from the ratchet when the plate is shifted by the cam, and means for shifting the plate in another direction to actuate the shutter-release mechanism and release the pawl and permit the latter to engage the ratchet.

6. In a camera driving mechanism, in combination, a ratchet, a cam co-axial therewith, a pawl carried by the cam to engage the ratchet whereby one may be driven by the other, changing mechanism and shutter-setting mechanism actuated by the driven element, shutter-release mechanism, an electric motor to actuate the driving element and having a normally open energizing circuit, a latch plate connected with the shutter-release mechanism and shiftable in one direction by the cam, a stop carried by the latch plate to cooperate with the pawl and disengage the same from the ratchet when the plate is shifted by the cam, means for shifting the plate in another direction to actuate the shutter-release mechanism and release the pawl and permit the latter to engage the ratchet, and means actuated by the cam to close the motor circuit and open the same again in harmony with the engagement and disengagement of the pawl and ratchet.

7. In a camera driving mechanism, in combination, a driving element, a driven element, one of said elements having a cam and the other having a ratchet, a pawl carried by the cam to engage the ratchet and thereby connect the two elements, changing mechanism and shutter-setting mechanism actuated by the driven element, a member shiftable in one direction by the cam to cooperate with the pawl and disengage the same from the ratchet and held by the cam against reverse movement until the changing mechanism and shutter-setting mechanism have been actuated, and shutter-release mechanism connected with said member for actuation by said reverse movement thereof.

8. In a camera, in combination, changing mechanism, shutter-setting mechanism, shutter-release mechanism, a driven element connected with the changing and shutter-setting mechanisms to actuate the same, a driving element, a ratchet connected with one of said elements and a pawl carried by the other to engage the ratchet and thereby connect the two elements, a member shiftable in one direction to actuate the shutter-release mechanism and shiftable in the opposite direction by the driven element to disengage the pawl from the ratchet when the changing and shutter-setting mechanisms have been actuated, an electric motor to actuate the driving element, and means actuated by the driven element to start the motor when the shutter-release mechanism is actuated and stop the motor when the pawl is disengaged from the ratchet.

9. In an automatic camera, in combination, changing mechanism, shutter-setting mechanism, shutter-releasing mechanism, means for actuating said mechanisms, and a solenoid having a core associated with said means to control the same, an energizing circuit for the solenoid, means for closing and opening said circuit to actuate the solenoid core electromagnetically, and means for actuating the core manually.

10. In an automatic camera having a shutter operating means, the combination of a camera driving mechanism including a main driving shaft, a plurality of devices to actuate the driving mechanism through said shaft, and connections between each end, said driving shaft and one of said devices constructed to enable at least one of said driving devices to over-run another.

11. In an automatic camera having a shutter operating means, a main driving shaft, the combination of camera driving devices, manual means and power-driven means to actuate said devices, and mechanism arranged at either end of said shaft for connecting said manual means and power-driven means with the driving devices and permitting either of said means to drive said devices without interference by the other.

12. In an automatic camera having a shutter operating means, the combination of a camera driving shaft, manual means to actuate the driving shaft, a motor to actuate the driving shaft, and automatic means arranged at either end thereof to disconnect the motor from said shaft when the latter is driven by the manual means.

13. In an automatic camera having a shutter operating means, the combination of a camera driving shaft, manual means for actuating the driving shaft, a motor, and a clutch connecting the motor with one end of said shaft and adapted to over-run when the said shaft is driven ahead of the motor by the manual means.

14. In an automatic camera having a shutter operating means, a main driving shaft, the combination of camera driving devices driven thereby, manual means and power-driven means to actuate said devices, and over-running clutches connecting said means with either end of said driving shaft.

15. In an automatic camera having a shutter operating means, the combination of camera driving devices, having a driving shaft, manual means and power-driven means to actuate said shaft, and automatic mechanism arranged at either end thereof to disconnect the other of said means when either is driving said shaft ahead of the other.

16. In an automatic camera having a shutter operating means, the combination of a camera driving mechanism, a driving shaft, manual means to actuate the driving shaft, a motor to actuate the driving shaft, and automatic means arranged at one end thereof to disconnect the motor from said shaft when the latter is driven by the manual means.

17. In an automatic camera having a shutter operating means, the combination of a camera driving mechanism, a driving shaft, manual means for actuating the driving shaft, a motor, and a clutch connecting the motor with one end of said shaft and adapted to over-run when the shaft is being driven ahead of the motor by the manual means at the other end of said shaft.

18. In an antomatic camera having a shutter operating means, the combination of a camera driving mechanism, a driving shaft therefor, manual means to rotate the shaft, a pair of clutch members capable of relative axial movement to engage and disengage each other, and a driving motor connected with one of said members, the other of said members being connected to the ends of said driving shaft to rotate the same and adapted to over-run when the shaft is driven ahead of the motor by said manual means.

19. In an automatic camera having a shutter operating means, the combination of a camera driving mechanism, a driving shaft therefor, manual means to rotate the driving shaft, a clutch member shiftable axially of the shaft and connected to one end thereof to drive the same; a clutch member alined with the first and arranged at the other end of said shaft, a motor connected with the said alined clutch member to drive the same, a spring to urge the shiftable member into engagement with the other, and cooperating teeth on the clutch members adapted to cam the shiftable member out of engagement with the other when the shiftable member is driven ahead of the latter by said manual means.

20. In an automatic camera having a shutter operating means, the combination of a camera driving mechanism, a driving shaft therefor, a plurality of driving means to rotate the driving shaft; and a plurality of over-running clutches for connecting the said means with the driving shaft, each comprising a member shiftable axially of the shaft and connected to one end thereof to drive the same, a clutch member alined with the first and connected to the other end of said shaft and with the respective driving means, a spring to urge the shiftable member into engagement with the other, and cooperating teeth on the clutch members adapted to cam the shiftable member out of engagement with the other when the shiftable member is driven ahead of the other.

21. In an automatic camera having a shutter operating means, the combination of a camera driving mechanism, a driving shaft therefor, manual means and a motor-actuated means to rotate the shaft, and a pair of clutches for connecting said manual means with one end of said shaft and the motor-driven means with the other end of said driving shaft, each clutch comprising a pair of clutch members capable of relative axial movement to engage and disengage each other, one of said members being connected to the respective driving means and the other to the driving shaft to rotate the same and adapted to over-run the first.

22. In an automatic camera having a shutter operating means, a main driving shaft, the combination of camera driving devices, manual means and power driven means to actuate said devices, and mechanism arranged at either end of said shaft for connecting said manual means and power driven means with the driving devices and permitting either of said means to drive said devices without interference by the other, said shaft operating a driving element, a driven element, changing mechanism connected with said driven element for actuation thereby, automatically engageable normally disengaged connecting devices associated with said elements to drive one from the other, a shiftable latching device to disengage said connecting devices and releasable therefrom to permit engagement thereof, shutter tripping means actuated by the latching device, and means actuated by one of said elements to prevent shifting of the latching device and consequent operation of the tripping means until the changing mechanism has operated.

In testimony whereof I hereto affix my signature.

SHERMAN M. FAIRCHILD.